US007130887B2

(12) United States Patent
Goldberg

(10) Patent No.: US 7,130,887 B2
(45) Date of Patent: Oct. 31, 2006

(54) METHOD AND SYSTEM FOR GENERATING SEPARATE E-MAIL TRANSMISSIONS TO COPIED RECIPIENTS FOR PROVIDING ADDITIONAL INFORMATION

(76) Inventor: Bernel Goldberg, 13413 NE. 27th St., Bellevue, WA (US) 98005

( * ) Notice: Subject to any disclaimer, the term of this patent is extended or adjusted under 35 U.S.C. 154(b) by 688 days.

(21) Appl. No.: 10/125,763

(22) Filed: Apr. 18, 2002

(65) Prior Publication Data

US 2003/0200263 A1 Oct. 23, 2003

(51) Int. Cl.
*G06F 15/16* (2006.01)

(52) U.S. Cl. ......................... 709/206; 709/217
(58) Field of Classification Search ........ 709/204–206, 709/217–219
See application file for complete search history.

(56) References Cited

U.S. PATENT DOCUMENTS

| | | | |
|---|---|---|---|
| 5,634,005 A | 5/1997 | Matsuo | |
| 5,930,479 A * | 7/1999 | Hall | 709/238 |
| 6,044,395 A * | 3/2000 | Costales et al. | 709/206 |
| 6,073,133 A | 6/2000 | Chrabaszcz | |
| 6,092,101 A | 7/2000 | Birrell et al. | |
| 6,192,396 B1 | 2/2001 | Kohler | |
| 6,247,043 B1 * | 6/2001 | Bates et al. | 709/200 |
| 6,247,045 B1 * | 6/2001 | Shaw et al. | 709/207 |
| 6,453,338 B1 | 9/2002 | Shiono | |
| 6,460,074 B1 | 10/2002 | Fishkin | |
| 6,499,021 B1 | 12/2002 | Abu-Hakima | |
| 6,510,453 B1 | 1/2003 | Apfel et al. | |
| 6,687,741 B1 | 2/2004 | Ramaley et al. | |
| 6,732,149 B1 | 5/2004 | Kephart | |
| 6,775,689 B1 * | 8/2004 | Raghunandan | 709/206 |
| 6,779,178 B1 | 8/2004 | Lloyd et al. | |
| 6,789,107 B1 * | 9/2004 | Bates et al. | 709/206 |
| 6,816,887 B1 * | 11/2004 | Shaw et al. | 709/207 |
| 6,839,741 B1 | 1/2005 | Tsai | |
| 7,035,902 B1 * | 4/2006 | Bates et al. | 709/206 |
| 2002/0013817 A1 * | 1/2002 | Collins et al. | 709/206 |
| 2002/0035607 A1 * | 3/2002 | Checkoway et al. | 709/206 |
| 2002/0049793 A1 | 4/2002 | Okumura et al. | |
| 2002/0069223 A1 | 6/2002 | Goodisman | |

(Continued)

FOREIGN PATENT DOCUMENTS

EP 1087315 A2 3/2001

*Primary Examiner*—David Wiley
*Assistant Examiner*—Joseph E. Avellino
(74) *Attorney, Agent, or Firm*—Mitch Harris, Atty at Law, LLC; Andrew M. Harris

(57) ABSTRACT

A method and system for generating e-mail transmissions to copied recipients for providing additional information determines when an e-mail user is sending carbon-copy and/or blind carbon-copy copies of an original e-mail transmission and provides a means for providing a second message containing commentary, explanation and/or clarification information. The copy list is scanned for copied recipients and depending on e-mail program settings, prompts the sender providing an option for generating an additional message in a new window wherein the sender may type additional text. A single additional message may be generated and sent to the copied recipients, individual additional messages may be generated and sent or a first additional message for the carbon-copied recipients and a second additional message for the blind-carbon-copied recipients may be generated and sent. The additional messages may optionally contain the quoted text of the original message, whereby the sender may comment on the original text. The additional messages may also include attachments provided with the original e-mail message.

21 Claims, 5 Drawing Sheets

U.S. PATENT DOCUMENTS

| | | |
|---|---|---|
| 2002/0107924 A1 | 8/2002 | Walsh |
| 2002/0129275 A1* | 9/2002 | Decuir .................. 713/201 |
| 2002/0169840 A1 | 11/2002 | Sheldon et al. |
| 2004/0073634 A1 | 4/2004 | Haghpassand |
| 2004/0103160 A1* | 5/2004 | Sheldon et al. ............. 709/206 |
| 2005/0182954 A1* | 8/2005 | Decuir ...................... 713/189 |
| 2005/0235041 A1* | 10/2005 | Salamuniccar .............. 709/206 |
| 2006/0026238 A1* | 2/2006 | Schwarz ..................... 709/206 |

* cited by examiner

METHOD AND SYSTEM FOR GENERATING SEPARATE E-MAIL TRANSMISSIONS TO COPIED RECIPIENTS FOR PROVIDING ADDITIONAL INFORMATION

BACKGROUND OF THE INVENTION

1. Field of the Invention

The present invention relates generally to electronic mail systems, and more specifically, to a method and system for generating an additional e-mail transmission to one or more recipients who are copied on an original electronic message.

2. Background of the Invention

Present-day network systems communicate through a variety of channels in order to interconnect computers. Electronic mail is in widespread use as a mechanism for communicating messages and for transferring documents, images, sound files and other media files.

E-mail programs and other programs such as Internet browsers having e-mail capability permit a computer user to create a message that is sent to an e-mail server for the recipient of the message. Typical e-mail programs provide a variety of features for sending an e-mail message. Often, a computer user generating an e-mail message copies the e-mail message to others using the carbon-copy (cc:) or blind-carbon-copy (bcc:) feature available in typical e-mail programs. The cc: recipients receive a copy of the e-mail and their address is visible to the other recipients. The bcc: recipients are not visible to the other recipients, making the copy a private message. The e-mail message is merely a copy of the message send to one or more designated recipients (the "to:" recipients) and does not contain any information other than the original e-mail content. In some cases the copied recipient may not understand the reason why they were copied or the meaning of the message content, therefore additional commentary or explanation is desirable. In particular, with bcc: recipients, the recipient may think that the copied message is not intended for them, as their address does not typically appear in the message header. Also, the current copying features in e-mail programs, while making it simple to copy additional recipients, fail to remind the user that commentary, explanation or clarification may be desired or that additional information that the sender intends to provide to one or more copied recipients has not yet been communicated.

Explanations and commentary are often desirable associated with copied e-mail messages, but presently the only way to accomplish this is to send an additional message to the copied recipients using the standard mechanism for generating new messages or forwarding a copy of a previously sent mail (typically in alternative to using a cc: or bcc: feature) to one or more other recipients. However, the methods described above are inconvenient, requiring in the case of a new message entering the copied recipients' address and subject line and requiring pasting the original message content if needed for commentary and reattaching attachments. In the case of a forwarded "sent" message, the subject line will typically contain a "FW:" indicator which may cause the recipient to think that the message has a low priority, and if the forwarding mechanism is not for "quoted" text by default, the sender will not be able to intersperse comments, but may only add a message above the forwarded content.

Therefore, it would be desirable to provide a method and system for generating an e-mail transmission to copied recipients for providing additional information for clarification, explanation or commentary.

SUMMARY OF THE INVENTION

The above objective of generating e-mail messages to copied recipients for providing additional information is achieved in a method and system. The method and system receive a user input indicating that an original e-mail message has been completed, determine whether or not a copied recipient is indicated, and in response to determining that a copied recipient is indicated, generating a new e-mail message for sending additional information to the copied recipient for clarification, explanation or commentary on the original e-mail message. The method may be embodied in a computer program product containing program instructions for execution within a general-purpose computer system.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

Figure 1:
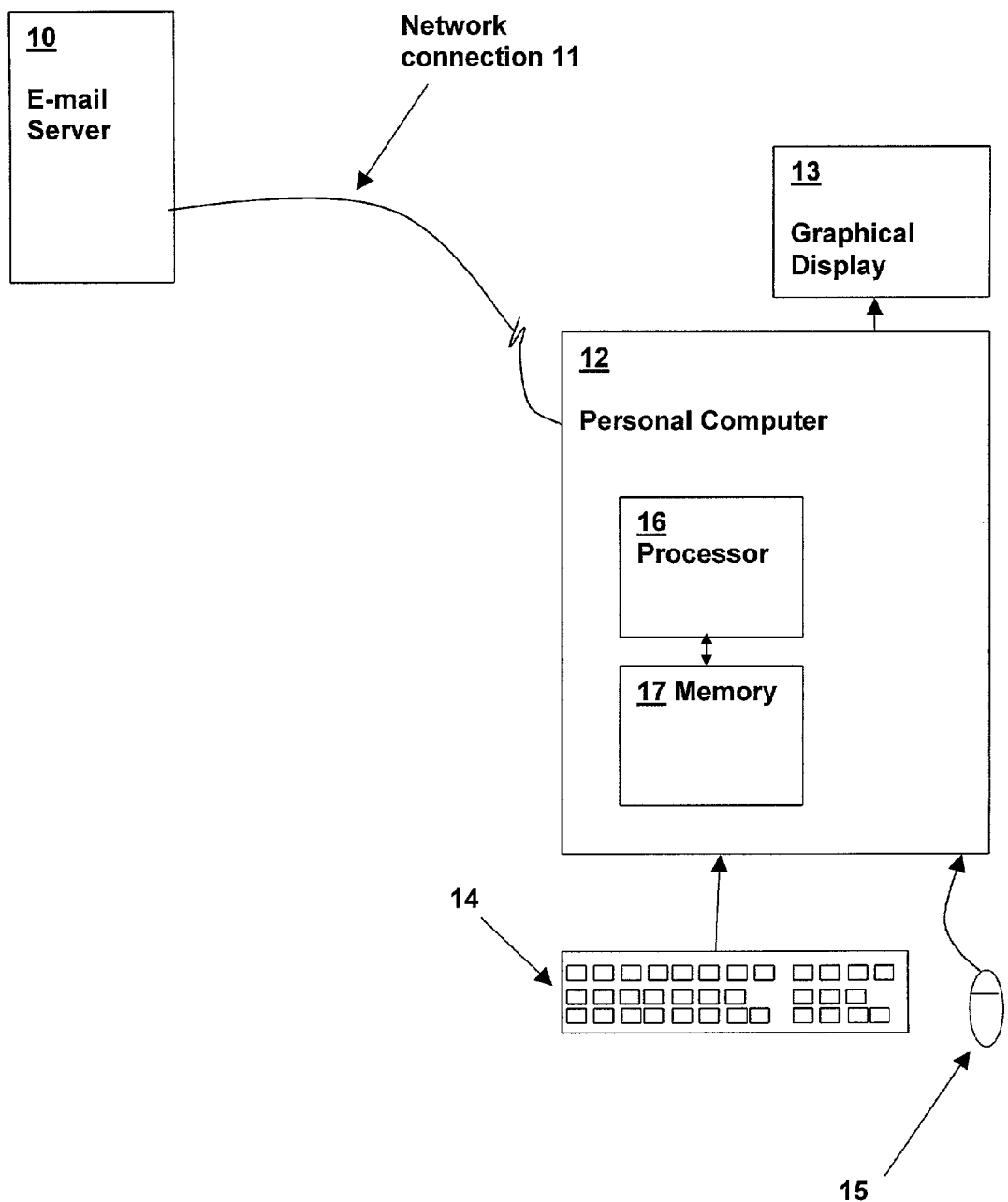
FIG. 1 is a block diagram depicting a networked computer system in which a preferred embodiment of the invention may be practiced.

Referring now to the figures and in particular to FIG. 1, a networked computer system within which a preferred embodiment of the present invention may be practiced is depicted in a block diagram. To support e-mail functions, an e-mail server 10 is coupled to the network via a network connection 11. Also coupled to the network is a personal computer 12 having a processor 16 coupled to a memory 17 for executing program instructions from memory 17. Personal computer 12 is coupled to a graphical display 13 for displaying program output and input devices such as a mouse 15 and a keyboard 14 for receiving user input. The networked computer system may be coupled to a public network such as the Internet, or may be a private network such as the various "intra-nets" that are implemented within corporate offices and other installations requiring secure data communications.

Within memory 17, an e-mail program embodying a method in accordance with a preferred embodiment of the present invention is executed by processor 16. Personal computer 12 is included to provide a demonstrative example of a general purpose computer, and it will be understood by those skilled in the art that the techniques of the present invention apply to a variety of other e-mail applications such as dedicated Internet appliances and large mainframe computers having user terminals. The present invention also applies to personal e-mail appliances such as personal digital assistants (PDAs) and e-mail enabled pagers and cellular telephones.

Figure 2:
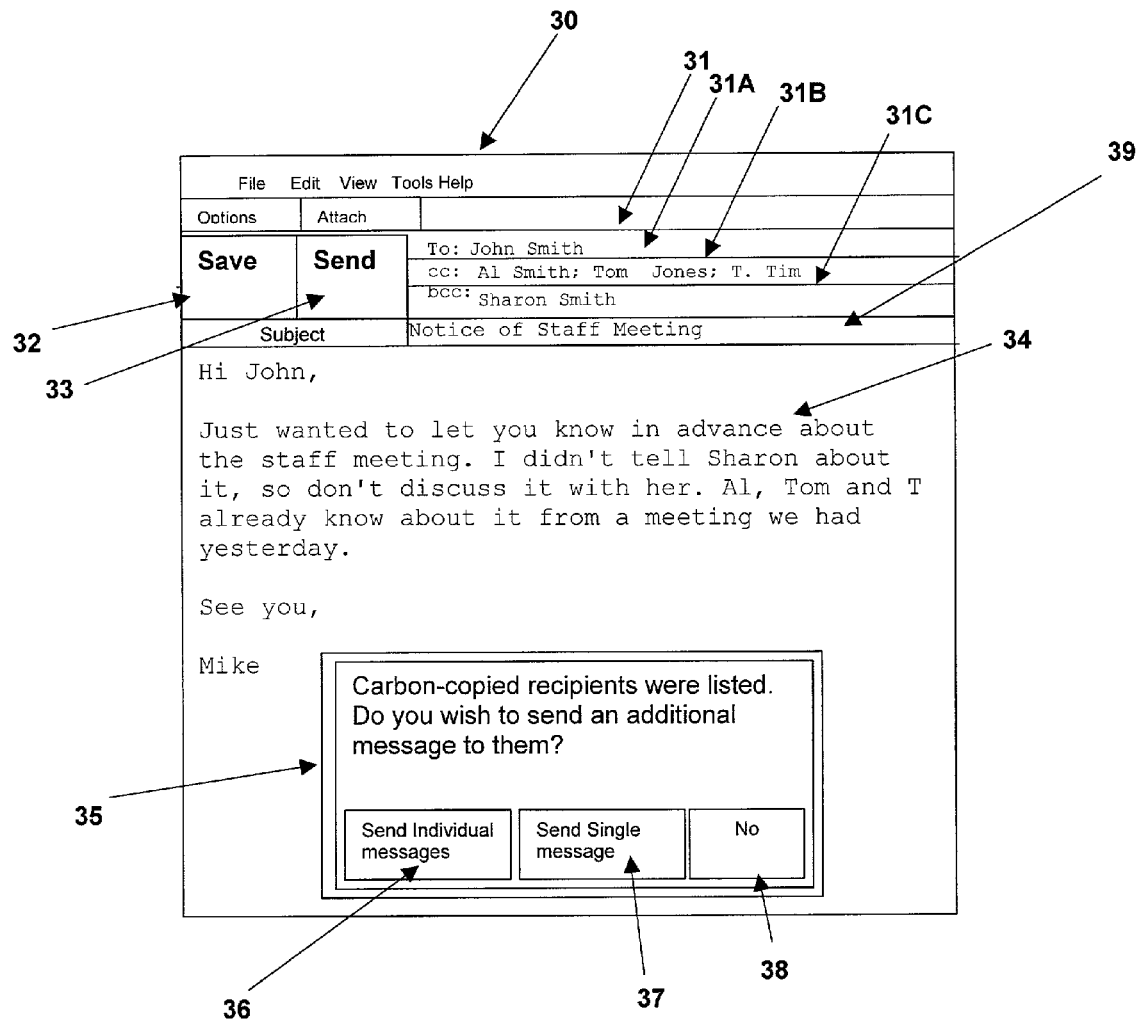
FIG. 2 is a pictorial diagram depicting output of an e-mail program displayed on the graphic display of FIG. 1, having a user prompt in accordance with a preferred embodiment of the invention.

Referring now to FIG. 2, an output of an e-mail program in accordance with a preferred embodiment of the invention is depicted. While the invention is depicted with screens in American English language, the invention may be adapted to other languages and other countries. E-mail program output 30 forms a user output on graphical display 13 to permit a computer user to interact with the e-mail program executing within personal computer 12. E-mail program output 30 has a frame with menu options and a message area 34 for entering the text of e-mail messages via keyboard 14. The e-mail message is sent by pressing a send button 33 in response to which the e-mail message and any attachments are sent to recipient's e-mail server 10, with the set recipients determined by the settings in the recipient lists entry area 31. The original recipients (To: recipients) are entered in "To:" list 31A, the carbon-copy (cc: recipients) are entered in "cc:" list 31B and the blind-carbon-copy recipients are entered in the "bcc:" list 31C. A subject line is entered in subject line entry area 39.

Alternatively, the e-mail message may be saved along with the customized characteristics for later transmission by pressing a save button 32. In response to completion of the e-mail message (by pressing send button 33 or save button 32), the user may be queried by a prompt dialog 35. Prompt dialog 35 notifies the user that one or more copied recipients were specified in cc: list entry area 31B and bcc: list entry area 31C and provides the user with an option that will generate additional messages to the copied recipients. Individual messages may be generated by selecting button 36 or a single message may be generated by selecting button 37. No additional message will be generated if the user declines by selecting button 38. The above options are exemplary and other options may ark be presented within prompt dialog 35 or configured via a control panel within the e-mail program that will be described in detail below. Generally, prompt dialog 35 may include options to generate separate group messages to the cc: list and bcc: list, individual messages for either group or both, and quotation options for repeating the content of the original message within the additional generated message permitting in-line commentary.

Figure 3:
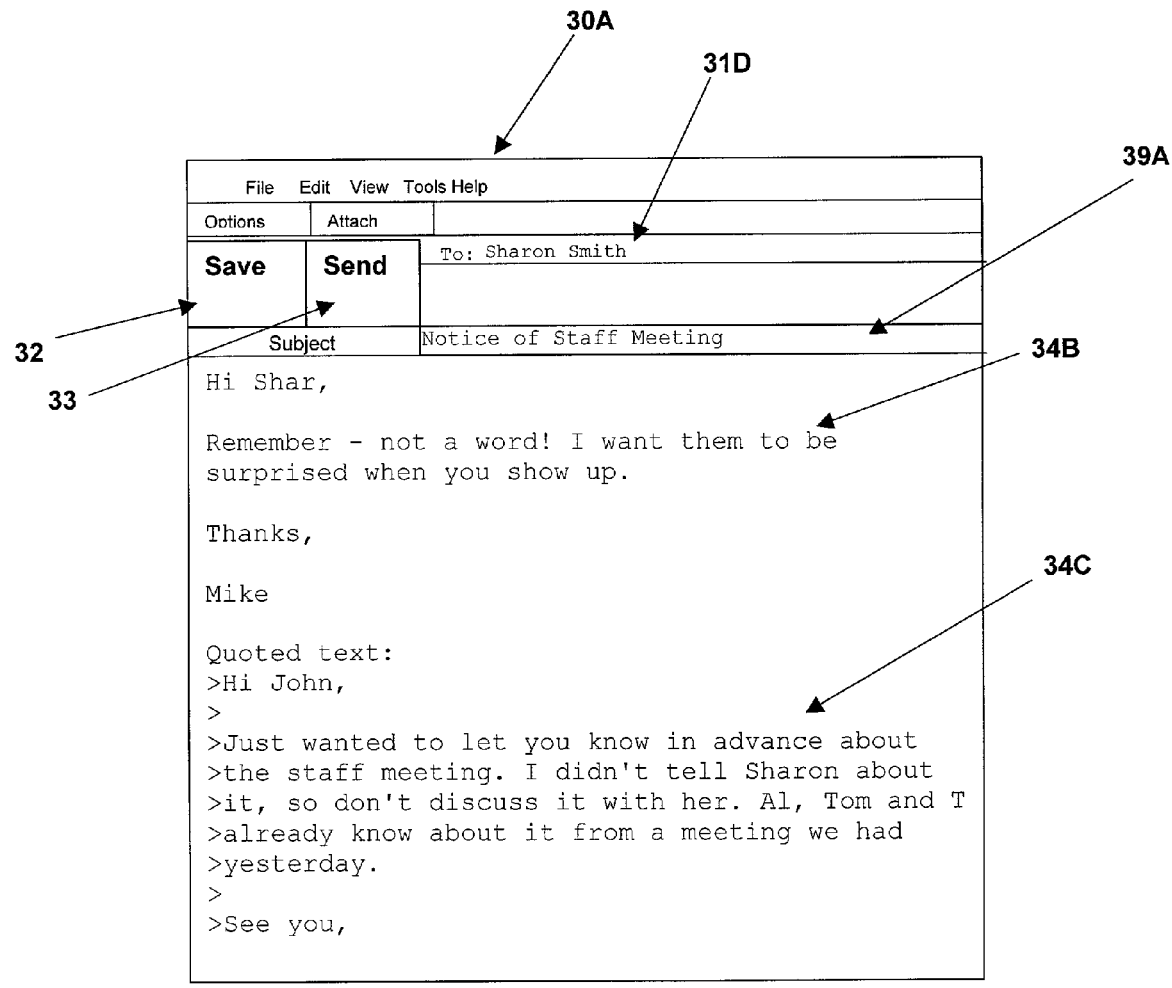
FIG. 3 is a pictorial diagram depicting output of an e-mail program displayed on the graphic display of FIG. 1, for generating an additional message in accordance with a preferred embodiment of the invention.

Referring now to FIG. 3, a second graphical output of an e-mail program in accordance with a preferred embodiment of the invention is depicted. The output screen 30A depicted is generated in response to the user selecting one of buttons 36 or 37 from prompt dialog 35. Output screen 30A represents the additional message generated and may be a new overlaid window or may be the main e-mail program message window. In the example screen 30A, the additional message is a message generated for the bcc: recipient of FIG. 2 and the address of bcc: recipient is automatically entered in a "To:" list 31D of output screen 30A. Multiple output screens may be generated in sequence for individual additional messages to each of the cc: and/or bcc: list entries if that option is selected (via button 36 or specified in the control panel) and "To:" list may contain more than one e-mail address when a single message is selected (via button 37) or selected via the control panel). Alternatively two output screens will be generated if the settings are such that an additional group e-mail message is to be generated for each of the bcc: list and cc: list.

Text entry area 34B permits the insertion of explanatory information and quoted text 34C that may be optionally automatically inserted within text entry area 34B, providing the user with editable text within which commentary may be interspersed. After the user has completed editing and entering text in text area 34B, the additional e-mail message may be sent by selecting send button 33 or saved via save button 32. The method of the present invention may be iterated by prompting the user at this point for additional copied recipients, permitting the user to copy the new message to yet another recipient or to themselves for record-keeping.

Figure 4:
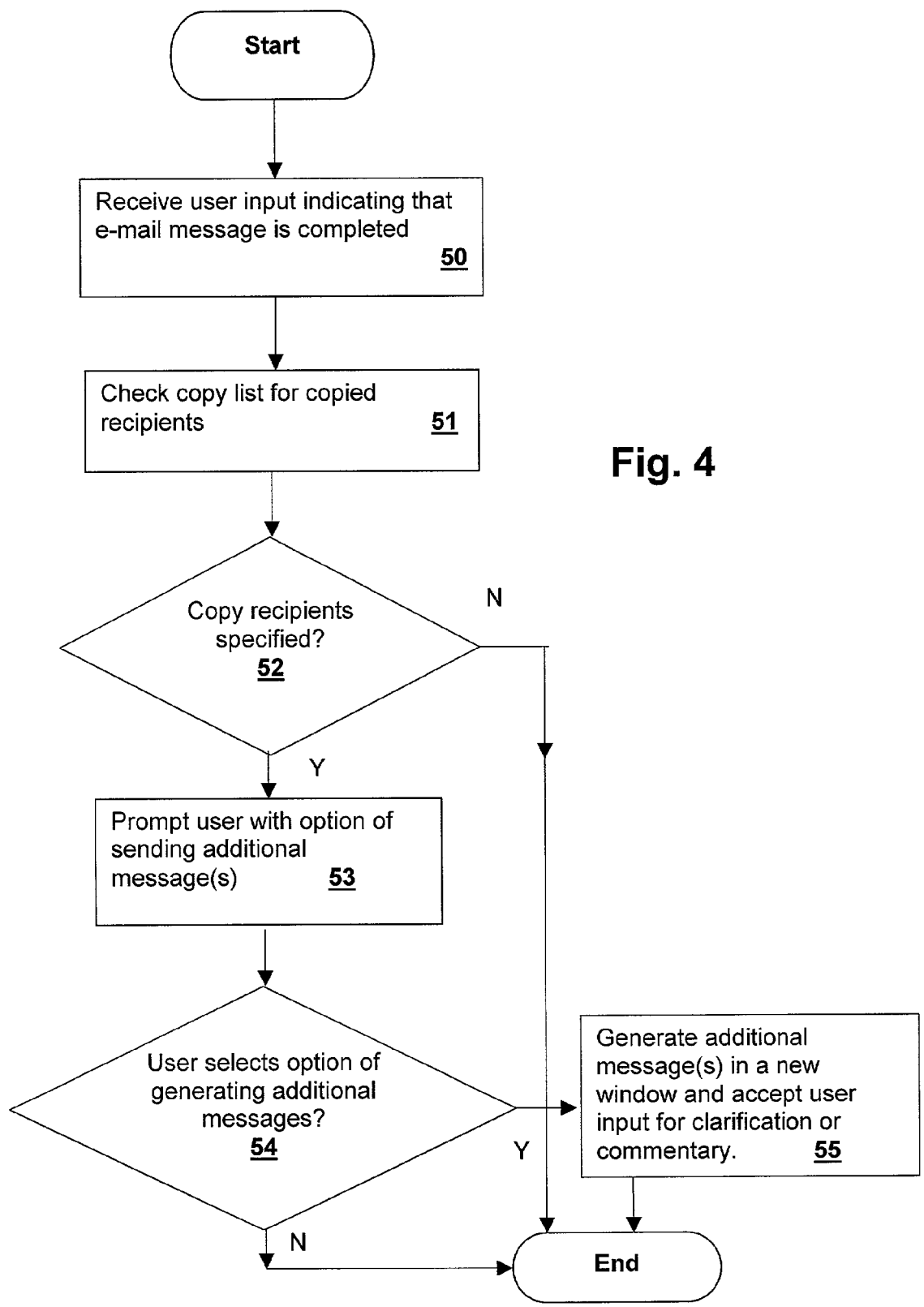
FIG. 4 is a flowchart depicting a method of operation of an e-mail generating system in accordance with a preferred embodiment of the invention.

Referring now to FIG. 4, a method in accordance with an embodiment of the present invention is depicted in a flowchart. When the e-mail sender provides a user input indicating that an e-mail message is completed (step 50), the copy lists (cc: and/or bcc: depending on options selected) are checked for copied recipients (step 51) and if copy recipients are specified (decision 52) the user is prompted to provide an option of generating additional messages (step 53). If the user selects the option to generate additional messages (decision 54), one or more additional messages are generated in one or more new windows to accept further user text input for commentary, explanation or clarification (step 55). (The additional e-mail message are then optionally transmitted or saved in a conventional manner.)

Figure 5:
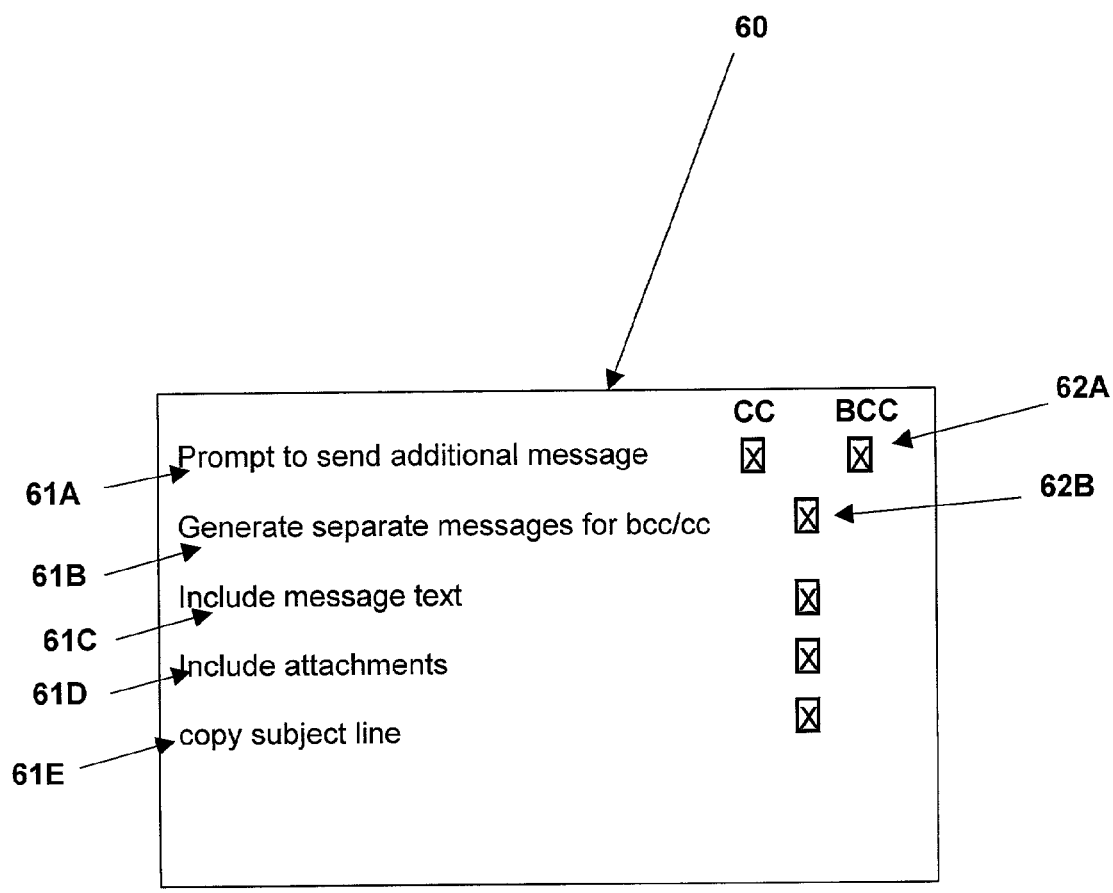
FIG. 5 is a pictorial diagram depicting an exemplary control panel for setting parameters of software implementing a method in accordance with a preferred embodiment of the invention.

Referring now to FIG. 5, a control panel 60 for configuring operating parameters of software implementing a method in accordance with an embodiment of the invention is depicted. Control panel 60 is exemplary and is included to illustrate some of the common options that may be provided to control the operation of the above-described software. Option 61A provides for selection of application of the method of the present invention to e-mail messages (in essence an on/off switch) as applied to bcc: or cc: recipients or both via selection boxes 62A. Option 61B provides the user the option of generating separate messages to copied recipients on the bcc: and cc: lists via the associated selection box and option 61E provides the user the option of automatically copying the original subject line to the subject line entry area within the new message(s). Option 61D provides the user the option of automatically attaching the attachments provided in the original e-mail message. Control panel 60 can be configured once to set the default operation of the method of the present invention as embodied in an e-mail program.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for generating e-mail transmissions, comprising:

receiving a user input indicating that an original e-mail message is complete;

transmitting said original e-mail message to all recipients indicated by a recipient list for said original email message;

determining whether or not at least one copied recipient has been specified in said recipient list, whereby said original e-mail message has been transmitted to said at least one copied recipient in said transmitting step;

in response to determining that said at least one copied recipient has been specified, second receiving second user input of further information associated with said original e-mail message;

generating a new e-mail message separate from said original message for transmission to said at least one copied recipient, wherein said further information associated with said original e-mail message is inserted for transmission to said at least one copied recipient; and transmitting said new e-mail message to said at least one copied recipient.

2. The method of claim 1, wherein said user input indicating that said e-mail message is complete is a user input instructing an e-mail program to send said e-mail message.

3. The method of claim 1, wherein said user input indicating that said email message is complete is a user input instructing an e-mail program to save said email message.

4. The method of claim 1, wherein said at least one copied recipient includes a carbon-copy recipient and a blind carbon-copy recipient and wherein said generating generates a first message for transmission to said carbon-copy recipient and a second message for transmission to said blind-carbon-copy recipient.

5. The method of claim 1, wherein said generating generates an additional e-mail message having the same subject line as said original e-mail message.

6. The method of claim 1, wherein said generating generates an additional e-mail message including text quoted from said original email message.

7. The method of claim 1, wherein said at least one copied recipient includes multiple copied recipients and wherein said generating generates multiple additional messages each for transmission to a particular one of said multiple copied recipients.

8. A system for generating e-mail transmissions, comprising:
   a memory for storing program instructions and data;
   a processor coupled to said memory for executing said program instructions; and
   a user input device coupled to said processor for receiving user input, wherein said program instructions include instructions for
   receiving a user input indicating that an original e-mail message is complete;
   transmitting said original e-mail message to all recipients indicated by a recipient list for said original email message;
   determining whether or not at least one copied recipient has been specified in said recipient list, whereby said original e-mail message has been is transmitted to said at least one copied recipient in said transmitting step;
   in response to determining that said at least one copied recipient has been specified, second receiving second user input of further information associated with said original e-mail message;
   generating a new e-mail message separate from said original message for transmission to said at least one copied recipient, wherein said further information associated with said original e-mail message is inserted for transmission to said at least one copied recipient; and
   transmitting said new e-mail message to said at least one copied recipient.

9. The system of claim 8, wherein said user input indicating that said e-mail message is complete is a user input instructing an email program to send said e-mail message.

10. The system of claim 8, wherein said user input indicating that said email message is complete is a user input instructing an email program to save said e-mail message.

11. The system of claim 8, wherein said at least one copied recipient includes a carbon-copy recipient and a blind carbon-copy recipient and wherein said program instructions for generating generate a first message for transmission to said carbon-copy recipient and a second message for transmission to said blind-carbon-copy recipient.

12. The system of claim 8, wherein said program instructions for generating generate an additional e-mail message having the same subject line as said original e-mail message.

13. The system of claim 8, wherein said program instructions for generating generate an additional email message including text quoted from said original e-mail message.

14. The system of claim 8, wherein said at least one copied recipient includes multiple copied recipients and wherein said program instructions for generating generate multiple additional messages each for transmission to a particular one of said multiple copied recipients.

15. A computer program product tangibly embodied in a computer readable medium containing program instructions for execution within a general purpose computer, wherein said program instructions comprise program instructions for:
   receiving a user input indicating that an original e-mail message is complete;
   transmitting said original e-mail message to all recipients indicated by a recipient list for said original e-mail message;
   determining whether or not at least one copied recipient has been specified in said recipient list, whereby said original e-mail message has been transmitted to said at least one copied recipient in said transmitting step;
   in response to determining that said at least one copied recipient has been specified, second receiving second user input of further information associated with said original e-mail message;
   generating a new e-mail message separate from said original message for transmission to said at least one copied recipient, wherein said further information associated with said original email message is inserted for transmission to said at least one copied recipient; and
   transmitting said new e-mail message to said at least one copied recipient.

16. The computer program product of claim 15, wherein said user input indicating that said e-mail message is complete is a user input instructing an e-mail program to send said e-mail message.

17. The computer program product of claim 15, wherein said user input indicating that said e-mail message is complete is a user input instructing an e-mail program to save said e-mail message.

18. The computer program product of claim 15, wherein said at least one copied recipient includes a carbon-copy recipient and a blind carbon-copy recipient and wherein said program instructions for generating generate a first message for transmission to said carbon-copy recipient and a second message for transmission to said blind-carbon-copy recipient.

19. The computer program product of claim 15, wherein said program instructions for generating generate an additional e-mail message having the same subject line as said original e-mail message.

20. The computer program product of claim 15, wherein said program instructions for generating generate an additional e-mail message including text quoted from said original e-mail message.

21. The computer program product of claim 15, wherein said at least one copied recipient includes multiple copied recipients and wherein said program instructions for generating generate multiple additional messages each for transmission to a particular one of said multiple copied recipients.

* * * * *